United States Patent
Wu et al.

(10) Patent No.: US 11,981,457 B1
(45) Date of Patent: May 14, 2024

(54) MULTIPURPOSE SPACECRAFT STRUCTURE AND PROPULSION SYSTEM

(71) Applicant: Ball Aerospace & Technologies Corp., Boulder, CO (US)

(72) Inventors: Gordon Wu, Lafayette, CO (US); Derek Chan, Boulder, CO (US); Christopher Lao, Boulder, CO (US); Clifford Lester, Boulder, CO (US)

(73) Assignee: BAE SYSTEMS SPACE & MISSION SYSTEMS INC., Broomfield, CO (US)

( * ) Notice: Subject to any disclaimer, the term of this patent is extended or adjusted under 35 U.S.C. 154(b) by 101 days.

(21) Appl. No.: 17/548,725

(22) Filed: Dec. 13, 2021

Related U.S. Application Data

(60) Provisional application No. 63/124,964, filed on Dec. 14, 2020.

(51) Int. Cl.
*B64G 1/10* (2006.01)
*B64G 1/22* (2006.01)
*B64G 1/64* (2006.01)
*B64G 1/40* (2006.01)

(52) U.S. Cl.
CPC .............. *B64G 1/641* (2013.01); *B64G 1/10* (2013.01); *B64G 1/222* (2013.01); *B64G 1/401* (2013.01)

(58) Field of Classification Search
CPC .......... B64G 1/641; B64G 1/10; B64G 1/222; B64G 1/401; B64G 1/402; F17C 2270/0194; B64D 37/10
See application file for complete search history.

(56) References Cited

U.S. PATENT DOCUMENTS

| | | | |
|---|---|---|---|
| 2,859,808 A * | 11/1958 | Youngquist | F02K 9/605 222/386.5 |
| 3,745,338 A | 7/1973 | Joyce | |
| 3,944,117 A * | 3/1976 | Gould | B64D 37/10 222/386.5 |
| 4,017,924 A | 4/1977 | Higgs | |
| 4,473,199 A | 9/1984 | Magill | |
| 4,556,180 A | 12/1985 | Manatt | |
| 4,682,744 A | 7/1987 | Gounder | |
| 4,723,736 A * | 2/1988 | Rider | F02K 9/605 244/171.1 |
| 4,854,526 A | 8/1989 | Rochefort | |
| 5,052,640 A | 10/1991 | Chang | |

(Continued)

FOREIGN PATENT DOCUMENTS

| | | |
|---|---|---|
| EP | 0476720 | 11/1994 |
| EP | 2740668 | 6/2014 |

(Continued)

*Primary Examiner* — Medhat Badawi
*Assistant Examiner* — Vicente Rodriguez
(74) *Attorney, Agent, or Firm* — Sheridan Ross P.C.

(57) ABSTRACT

Systems and methods for providing a spacecraft are provided. The spacecraft includes a main structural member that extends between end panels of the spacecraft, and that defines a first interior volume. A fuel tank is disposed within and conforms to at least a portion of the first interior volume. The fuel tank can itself include a central void that defines a second interior volume. The main structural member and the fuel tank can be cylindrical. Payload items or components of the spacecraft can be disposed within the second interior volume.

20 Claims, 9 Drawing Sheets

(56) References Cited

U.S. PATENT DOCUMENTS

| | | | |
|---|---|---|---|
| 5,222,873 A | 6/1993 | Whitehead et al. | |
| 5,505,153 A | 4/1996 | Veazey | |
| 6,036,144 A | 3/2000 | Sisk | |
| 6,138,951 A | 10/2000 | Budris et al. | |
| 6,193,193 B1 * | 2/2001 | Soranno | B64G 1/007 244/159.4 |
| 6,206,327 B1 | 3/2001 | Benedetti et al. | |
| 6,234,224 B1 | 5/2001 | Schultz, Jr. | |
| 6,289,818 B1 | 9/2001 | Mueller et al. | |
| 6,726,151 B2 | 4/2004 | Hebert | |
| 6,939,073 B1 | 9/2005 | Ahmed et al. | |
| 7,252,269 B1 | 8/2007 | Ford | |
| 7,762,498 B1 * | 7/2010 | Henderson | B64G 1/406 244/171.1 |
| 8,210,478 B2 | 7/2012 | Smith | |
| 8,769,923 B2 | 7/2014 | Yamamoto et al. | |
| 8,915,472 B2 | 12/2014 | Aston et al. | |
| 8,973,873 B2 * | 3/2015 | Aston | B64G 1/641 244/172.3 |
| 9,027,889 B2 * | 5/2015 | Aston | B64G 1/402 244/173.1 |
| 9,296,493 B2 | 3/2016 | Aston et al. | |
| 9,394,065 B2 | 7/2016 | Aston et al. | |
| 9,446,863 B2 * | 9/2016 | Cheynet de Beaupre | B64G 1/641 |
| 9,604,736 B2 | 3/2017 | Jaeger | |
| 9,745,083 B2 | 8/2017 | Smith et al. | |
| 9,957,068 B2 | 5/2018 | Aston et al. | |
| 10,407,190 B2 | 9/2019 | Fernandez et al. | |
| 10,569,908 B1 * | 2/2020 | Coyne | B64G 1/002 |
| 10,633,123 B2 * | 4/2020 | Chiang | B64G 1/641 |
| 10,689,132 B2 | 6/2020 | Peterka, III et al. | |
| 10,731,613 B2 | 8/2020 | Bykowski | |
| 2002/0179776 A1 | 12/2002 | Mueller et al. | |
| 2003/0121481 A1 | 7/2003 | Dodd et al. | |
| 2005/0029817 A1 | 2/2005 | Gizara | |
| 2010/0019084 A1 | 1/2010 | Sisk | |
| 2015/0151855 A1 | 6/2015 | Richards et al. | |
| 2015/0232205 A1 | 8/2015 | Lively et al. | |
| 2016/0052621 A1 | 2/2016 | Ireland et al. | |
| 2016/0238505 A1 * | 8/2016 | Honda | G01G 9/00 |
| 2017/0057669 A1 | 3/2017 | Vichnin et al. | |
| 2017/0096240 A1 | 4/2017 | Cook et al. | |
| 2019/0023421 A1 | 1/2019 | Nicholson et al. | |
| 2019/0135413 A1 | 5/2019 | Moore et al. | |
| 2019/0360431 A1 * | 11/2019 | Baekby Bjarnoe | B64G 1/402 |
| 2020/0055611 A1 | 2/2020 | Walters et al. | |
| 2020/0299006 A1 | 9/2020 | Kim et al. | |
| 2021/0053702 A1 | 2/2021 | Aston et al. | |
| 2021/0347504 A1 | 11/2021 | York et al. | |

FOREIGN PATENT DOCUMENTS

| | | |
|---|---|---|
| EP | 3653516 | 5/2020 |
| WO | WO 01/89927 | 11/2001 |
| WO | WO 2008/046878 | 4/2008 |
| WO | WO 2008/046879 | 4/2008 |
| WO | WO 2014/090737 | 6/2014 |
| WO | WO 2015/039970 | 3/2015 |

* cited by examiner

MULTIPURPOSE SPACECRAFT STRUCTURE AND PROPULSION SYSTEM

CROSS-REFERENCE TO RELATED APPLICATIONS

This application claims the benefit of U.S. Provisional Patent Application Ser. No. 63/124,964, filed Dec. 14, 2020, the entire disclosure of which is hereby incorporated herein by reference.

FIELD

Systems and methods for configuring spacecraft structures and propulsion systems are provided.

BACKGROUND

Spacecraft, including but not limited to satellites, are expensive to produce and launch. In an effort to drive down the costs associated with deploying spacecraft, efforts have been made to simplify their design. In addition, systems have been developed that allow multiple spacecraft to be carried by and deployed from a single launch vehicle. By increasing the number of spacecraft carried by a single launch vehicle, the cost of the launch vehicle on a per spacecraft basis can be decreased as compared to a launch vehicle carrying a smaller number of spacecraft. Accordingly, there is interest in designing the individual spacecraft to be as compact and space efficient as possible.

In order to accommodate multiple spacecraft within a single launch vehicle, various arrangements have been proposed or implemented. For example, spacecraft have been stacked one on top of the other. As still another example, small spacecraft have been disposed radially about the center axis of the launch vehicle. A particular implementation of this type of arrangement is the Evolved Expendable Launch Vehicle Secondary Payload Adaptor or ESPA ring. Moreover, multiple ESPA rings can be stacked, one on top of the another. In any of the various configurations, it is advantageous if the individual spacecraft carried by the launch vehicle are as compact as possible, to allow the total number of spacecraft carried by any one launch vehicle to be maximized.

It is also desirable to provide individual spacecraft that have the ability to propel themselves to higher orbits than a general deployment orbit, for example from a geostationary transfer orbit (GTO) to a geosynchronous orbit (GEO) in a short amount of time, to perform shorter range maneuvers, and to perform attitude control operations. This has limited the ability of designers to reduce the size of the spacecraft, as the propellant storage volumes required to support such movements occupy a certain minimum amount of space. In addition, the pressurized tanks that are typically used to carry fuel often feature spherical or ellipsoidal form factors, which are difficult to package efficiently. This can result in unusable, wasted volumes within the spacecraft structure. This can also result in the need to locate tanks at a distance from the spacecraft centerline, in a cantilevered configuration, resulting in reduced structural efficiency and thrust inefficiencies.

In addition to requiring relatively large amounts of fuel, spacecraft that are deployed at high altitudes generally require higher gain antennas, to enable high data rates for radio frequency communications with ground stations and with other spacecraft over large distances. These in turn are typically associated with relatively large reflectors, which require a relatively large stowed volume. This, as well as the desirability of providing space for other spacecraft components, increases the need to maximize space utilization efficiency in the spacecraft.

Accordingly, it would be desirable to provide a spacecraft structure that facilitated a relatively compact stowed spacecraft size, while maximizing the utilization of fuel and payload volumes.

SUMMARY

Systems and methods for providing a spacecraft are disclosed. More particularly, systems and methods for providing a spacecraft that is compact, and that provides for the efficient utilization of space within an envelope of the spacecraft are provided. In accordance with embodiments of the present disclosure, the spacecraft features a support structure that includes a main structure having a main structural member generally extending between first (e.g. top) and second (e.g. bottom) end panels. The main structural member can be cylindrical. A fuel tank is disposed within a first volume defined at least in part by the main structural member and the end panels. The fuel tank is conformal with at least portions of the first volume, and can include an interior wall that defines at least a portion of a second interior volume or storage volume. Accordingly, the fuel tank can provide an annular fuel storage volume. The main structural member, the fuel tank, and the second interior volume can be centered along a centerline of the spacecraft. One or more auxiliary fuel tanks, components, or the like can be disposed within the second interior volume.

In accordance with further embodiments of the present disclosure, the spacecraft includes a plurality of side panels that cooperate with the end panels to define an exterior structure. The main structural member can be dimensioned to facilitate mounting the spacecraft to a mounting ring within a launch vehicle. The fuel tank can be used to store fuel in a liquid state. In addition, the spacecraft can include a fuel pump to deliver fuel from the fuel tank to a thruster.

Methods in accordance with embodiments of the present disclosure include mounting a spacecraft to a fixture within a payload volume of a launch vehicle. The interface between the fixture and the spacecraft can include mounting features that are provided as part of or that are connected to a cylindrical main structural member of a spacecraft support structure. A conformal fuel tank can be located within a cylindrical interior volume of the spacecraft support structure. The conformal fuel tank can itself include a cylindrical storage volume that is, like the cylindrical element of the support structure and the fuel tank, disposed along a centerline of the spacecraft. The methods can further include disposing additional components within the storage volume, such as but not limited to an auxiliary fuel tank or other components. As a particular example, a component in the form of a deployable antenna can be stowed within the storage volume. After the spacecraft has been delivered to a desired location by the launch vehicle, it is separated from the launch vehicle, and can move to an operating location or attitude using thrusters supplied with fuel stored in the fuel tank as a liquid. Moreover, when in the operating location or attitude, a deployable antenna or other components can be placed in an operational state.

Additional features and advantages of embodiments of the present disclosure will become more readily apparent from the following description, particularly when taken together with the accompanying drawings.

DETAILED DESCRIPTION

Figure 1A:
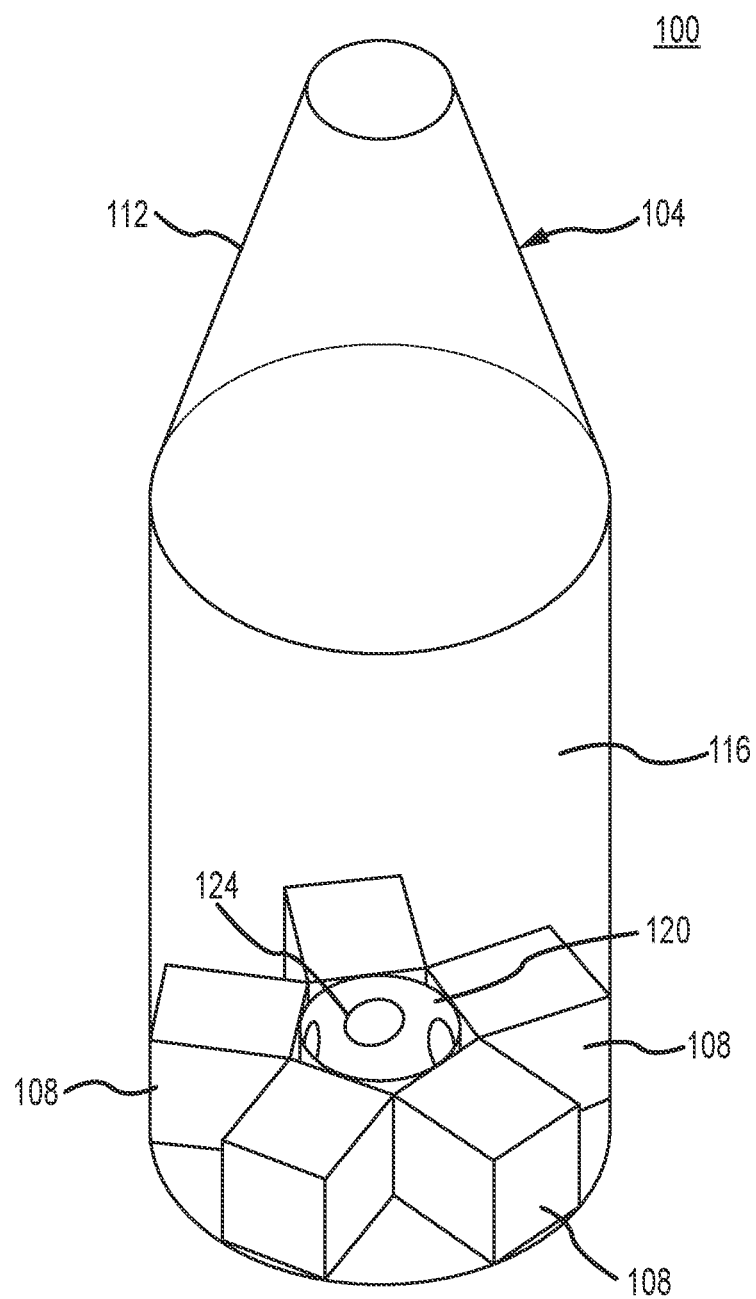
FIG. 1A depicts a payload portion of a launch vehicle and multiple spacecraft carried by the launch vehicle in accordance with embodiments of the present disclosure in a perspective view.
Figure 1B:
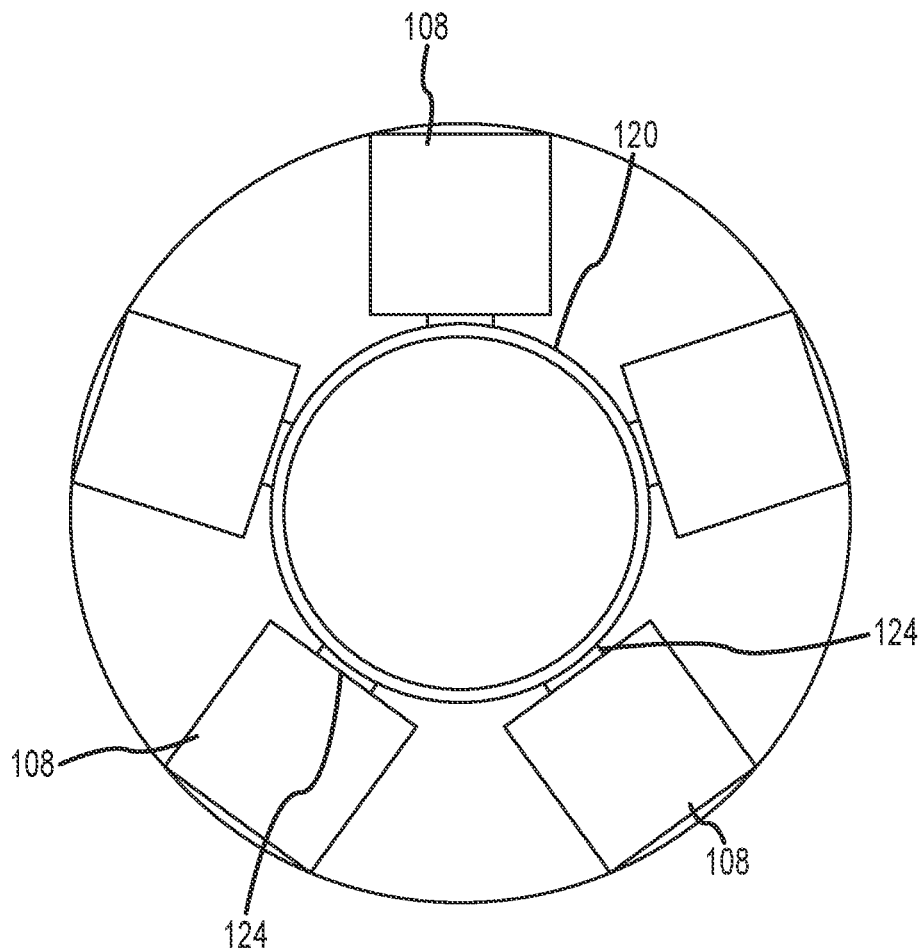
FIG. 1B depicts a payload portion of a launch vehicle and multiple spacecraft carried by the launch vehicle in accordance with embodiments of the present disclosure in a top plan view.

FIGS. 1A and 1B depict portions of a spacecraft system 100 in accordance with embodiments of the present disclosure. More particularly, FIG. 1A is a perspective view and FIG. 1B is an end or top plan view of a payload portion of a launch vehicle 104 in which multiple spacecraft 108 in accordance with embodiments of the present disclosure are carried. More particularly, as depicted in the figure, the launch vehicle 104 can include a nose cone or fairing 112 (shown in phantom in FIG. 1A) defining a payload volume 116. Within the payload volume 116 are one or more payload structures 120, each having one or more mounting fixtures or ports 124 to which the spacecraft 108 or other payloads can be mounted. For example, the launch vehicle 104 can include a payload or mounting structure 120 disposed within the payload volume 116 and having a number of radially disposed ports 124 to which the spacecraft 108 can be interconnected during launch and transport. In the illustrated embodiment, the mounting structure 120 is an ESPA Grande ring having five 24 inch (610 mm) diameter ports 124. In other embodiments, the mounting structure 120 can be in the form of an ESPA ring having six 15 inch (380 mm) diameter ports 124, or can be configured according to some other standard. In still other embodiments, the mounting structure 120 need not conform to a standardized configuration. Although a configuration with a single mounting ring 120 is shown, it should be appreciated that multiple mounting rings 120 can be stacked, to enable additional spacecraft 108 or other components to be carried by the launch vehicle 104. Moreover, the mounting structure 120 need not provided radially disposed ports. For example, a mounting structure 120 can provide one or more linearly stacked mounting fixtures 124.

In a typical implementation, the launch vehicle 104 is configured to carry the spacecraft 108, which can include but are not limited to satellites, smallsats, or other spacecraft, from a launch site to a location in orbit or in interstellar space. Once at the intended location, one or more of the spacecraft 108 can be separated from the launch vehicle 104. The separated spacecraft 108 can then deploy any included components that have been stowed during transport, and/or can activate an internal propulsion system to place the spacecraft 108 at an operational location.

Figure 2:
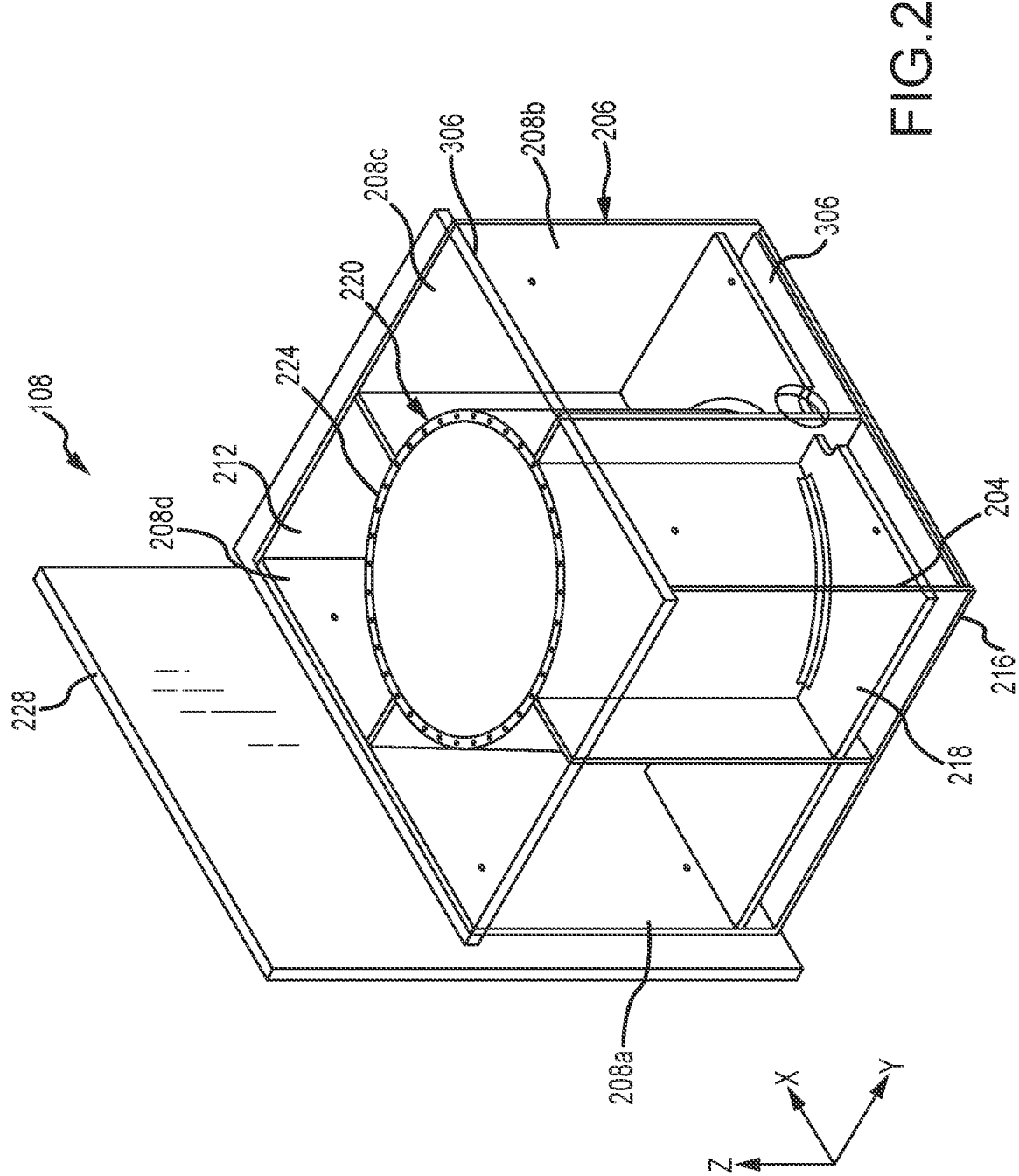
FIG. 2 is a perspective view of a spacecraft in accordance with embodiments of the present disclosure.

FIG. 2 is a perspective view of a spacecraft 108 in accordance with embodiments of the present disclosure. As depicted in this example, the spacecraft 108 can have an exterior structure or envelope 204 formed from a plurality of plates or panels 206, with a support structure 220 disposed therein. In the illustrated example, the panels 206 of the exterior structure 204 include side panels 208, a first end or top panel 212, a second end or bottom panel 216, and a shelf or floor panel 218. Accordingly, the various panels 206 can be configured to define a cube. In order to provide a view of support structure components 220 within interior portions of the spacecraft 108, the top panel 212 and the side panels 208a and 208b are depicted in the figure in phantom form. In accordance with embodiments of the present disclosure, the support structure 220 includes a main structural member 224. The main structural member 224 may be in the form of a cylinder, a multifaceted tube, a rectangle, a square, truss structure, or the like. Moreover, the main structural member 224 can be dimensioned or otherwise configured to facilitate mating the spacecraft 108, and in particular the support structure 220 of the spacecraft 108, to a fixture or port 124 of a mounting structure 120. In addition, one or more external components 228, such as but not limited to a solar panel, antenna, manipulator arm, sail, engine nozzle or thruster, or other structure can be attached to the spacecraft 108.

Figure 3:
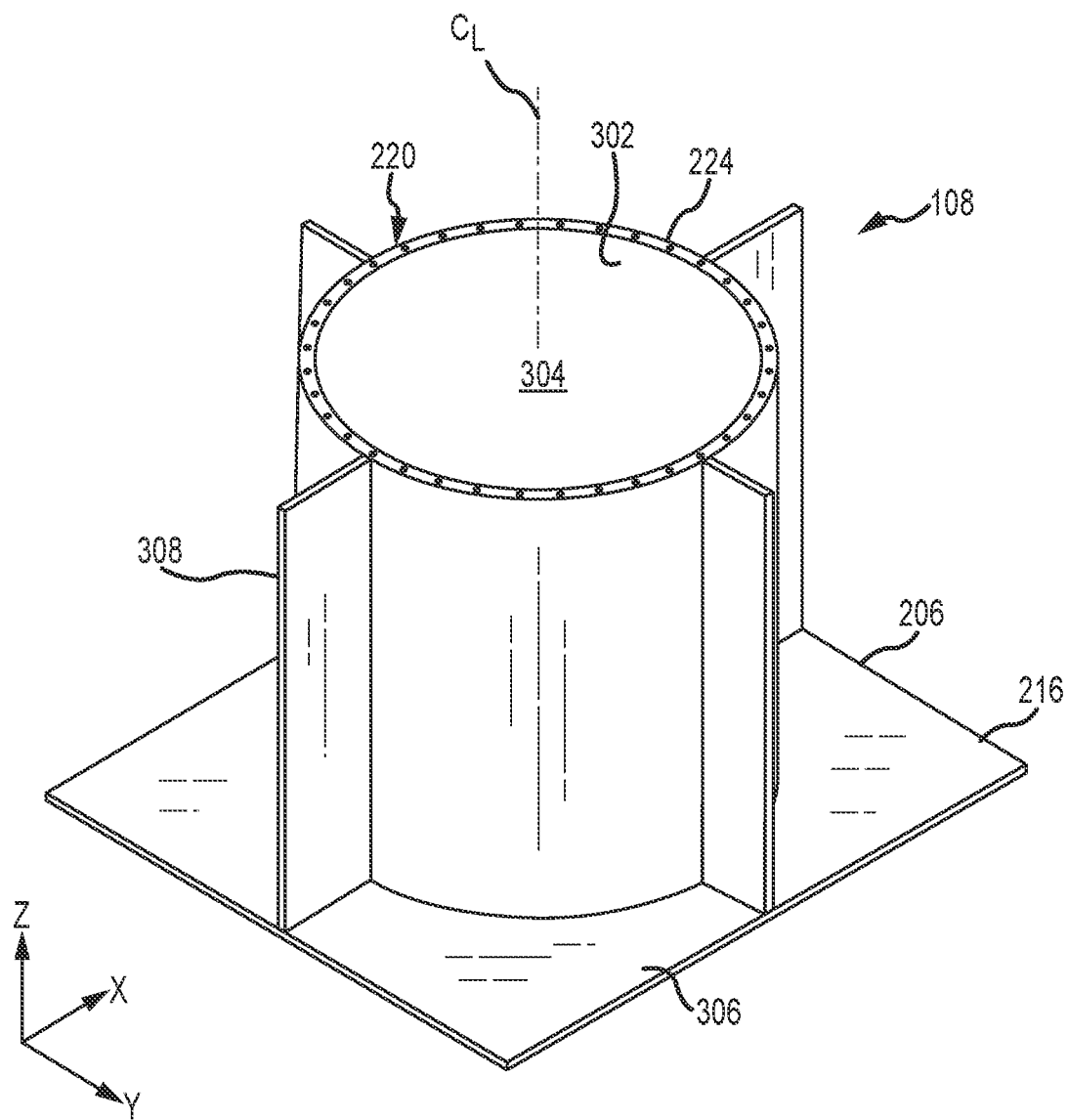
FIG. 3 is a perspective view of components of a spacecraft support structure in accordance with embodiments of the present disclosure.

FIG. 3 is a perspective view of components that can be included in a support structure 220 in accordance with embodiments of the present disclosure. As shown in this example, the support structure 220 can include a main structural member 224 in the form of an open elongated member, such as an open cylinder or an open multifaceted member. In accordance with embodiments of the present disclosure, the main structural member 224 is centered on a center line CL of the spacecraft 108. The main structural member 224 can have a length such that it at least extends between opposing panels 206 (e.g. the top 212 and bottom 216 panels) of the exterior structure 204. In accordance with further embodiments of the present disclosure, the main structural member 224 extends through at least one of the end panels 212 or 216 and incorporates a fixture or fixtures that secure the spacecraft 108 to the mounting ring or structure 120 of the launch vehicle 104 while the spacecraft 108 is being transported to a deployment location.

In addition, the main structural member 204 of the spacecraft 108 has an interior surface 302 defining at least some boundaries of a first interior volume 304, for example in a width dimension lying in an X-Y plane that is generally parallel to the top 216 and bottom 212 panels. The length dimension of the first interior volume 304, lying along the centerline or Z axis of the spacecraft 108, can be defined by the distance between the top 212 and bottom 216 panels. The width dimension or diameter of the main structural member 224 may be centered within the top 212 and bottom 216 panels, and can be spaced apart from the side panels or surfaces 208 of the exterior structure 204. In such a configuration, support walls or shear panels 308 that extend for the same length as the main structural member 224, and that extend from an outer dimension of the main structural member 224 to corresponding walls 208 of the exterior structure 204 can be provided. In other configurations, the support walls 308 can extend for only part of the length of the main structural member 224. Moreover, the support walls 308 need not extend the entire distance between the main structural member 224 and the walls 208. In the illustrated example, the support walls 308 are disposed along principal axes (e.g. the X and Y axes) of the spacecraft 108, however other configurations are possible. In addition, any number of support walls 308 can be provided. Some or all of the components of the support structures 208 can be fixed or otherwise interconnected to the panel 206 forming the top plate 212. In addition, some or all of the components of the support structure 208 can be fixed or otherwise interconnected to the bottom plate 216. In accordance with still other embodiments of the present disclosure, support walls that are generally parallel to the end panels 212 and 216, such as a floor or shelf 218, can be provided.

Figure 4:
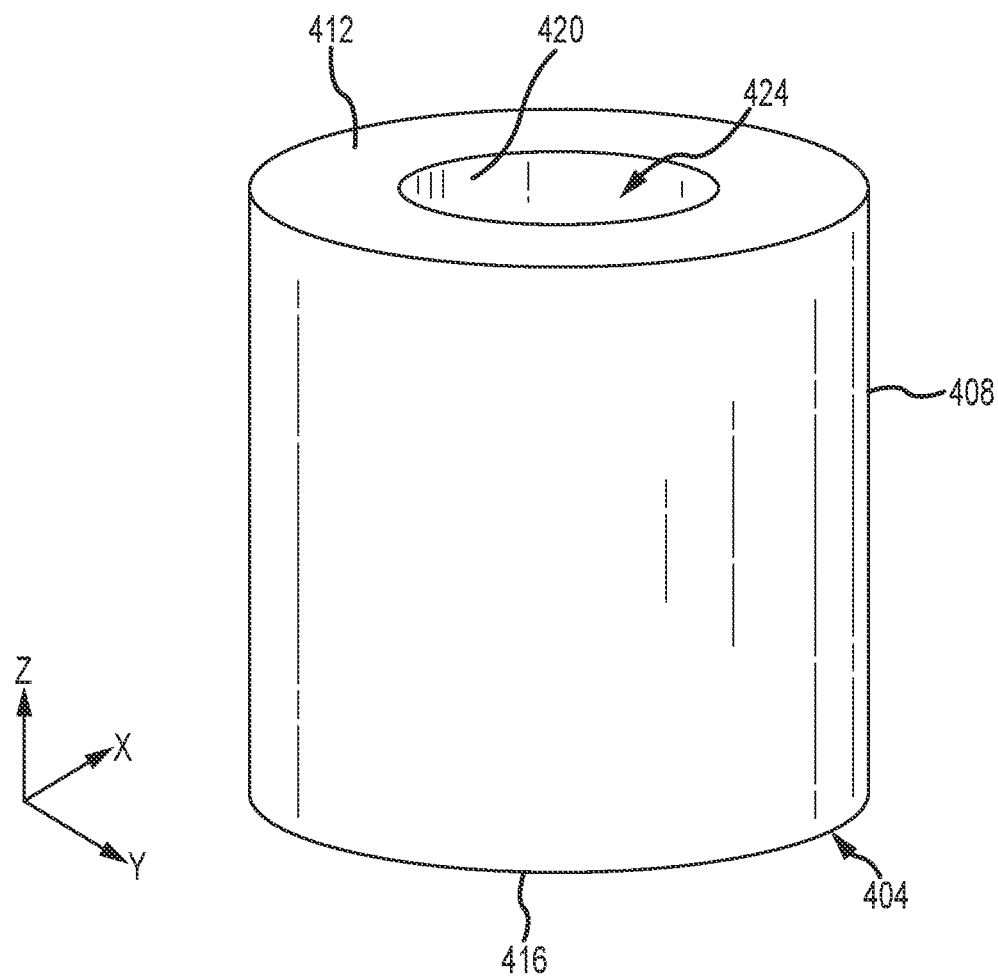
FIG. 4 is a perspective view of a spacecraft fuel tank in accordance with embodiments of the present disclosure.

Various components or structures can be located within the first interior volume 304 of the main structural member 224. For example, in accordance with embodiments of the present disclosure, the spacecraft 108 includes a fuel or propellant tank 404 (see FIG. 4) providing a fuel storage volume and having an exterior diameter that conforms to the interior surface 302 of the main structural member 224 and that is disposed within that interior volume 304. In addition, an exterior surface at one or both ends of the fuel tank 404 can be planar or otherwise shaped to follow or conform to an interior surface 306 of an adjacent end plate 212 or 216. As used herein, an exterior surface of a fuel tank 404 conforms to an interior surface 302 or 306 of the first interior volume 304 if a portion of the exterior surface is in contact with or is equidistant from the adjacent surface for at least some distance. For example, the fuel tank 404 can generally describe a cylindrical shape or form with a width or diameter of a body or outer wall portion 408 in an X-Y plane that is equal or about equal to the interior width or diameter of the first interior volume 304 and a length or height in a Z axis direction that is equal or about equal to the length of the first interior volume 304, and with planar or substantially planar top 412 and bottom 416 and portions. Accordingly, all or several of the outer dimensions of the fuel tank 404 can conform to the dimensions of the first interior volume 304. As noted, the fuel tank 404 can be conformal to some or all of the internal surfaces 302, 304 and 306 of the spacecraft 108 support structure 220. In accordance with further embodiments of the present disclosure, the fuel storage volume of the fuel tank 404 can be defined by one or more of the support structure 220 surfaces 302 or 306.

In accordance with at least some embodiments of the present disclosure, in addition to providing a storage volume for fuel, the fuel tank 404 can include an interior wall 420 defining a central void or second interior volume 424 within the larger first interior volume 304. In accordance with at least some embodiments of the present disclosure, the second interior volume 424 can have a cylindrical shape. Accordingly, the fuel tank 404 can provide an annular or ring shaped fuel storage volume with flat top 412 and bottom 416 portions. As discussed in greater detail elsewhere herein, the second interior volume 424 defined by the fuel tank 404 can be occupied, in whole or in part, by other components of the spacecraft 108, payload, or other items associated with or carried by the spacecraft 108. In accordance with embodiments of the present disclosure, the fuel tank 404 and the second interior volume 424 are centered on the centerline CL of the spacecraft 108.

Figure 5:
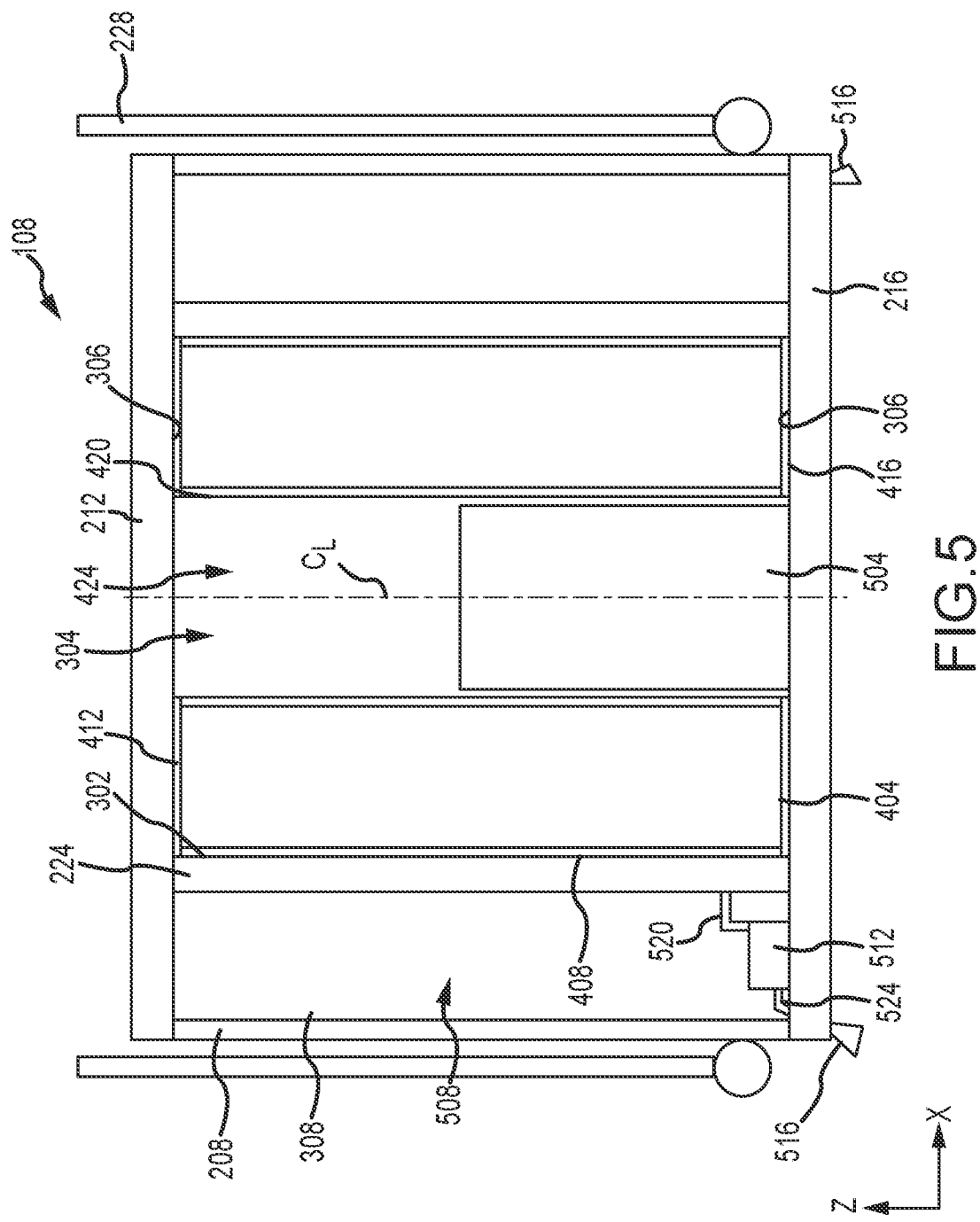
FIG. 5 depicts a cross-section view in elevation of a spacecraft in accordance with embodiments of the present disclosure.

FIG. 5 depicts a spacecraft 108 in accordance with embodiments of the present disclosure in a cross-section view. In this example, the spacecraft 108 includes a fuel tank 404 that extends between interior or facing surfaces 306 of the top plate 212 and the bottom plate 216 of the exterior structure 204. In addition, a width or outer diameter of the fuel tank 404 matches the interior dimension of the main structural member 224, such that an exterior of the fuel tank 404 body portion 408 lies against interior surface 302 of the main structural member 424. Accordingly, the fuel tank 404 can have a cylindrical body portion 408 that extends in a Z axis direction between flat top 412 and bottom 416 surfaces, such that exterior surfaces of the end portions 412 and 416 are in contact with the interior surfaces 306 of the top 212 and bottom 216 panels respectively. As can be appreciated by one of skill in the art after consideration of the present disclosure, this type of configuration offers maximum support for the fuel tank 404 and the contents thereof. The fuel tank 404 in this example also includes an interior wall 420 that defines an open, cylindrical space centered within the fuel tank 404, and extending over a full height of the fuel tank 404, establishing a second interior volume 424. The second interior volume 424 defined by the fuel tank 404 provides a space in which other payload or spacecraft components can be located.

In the illustrated example, the second interior volume 424 defined by the fuel tank 404 interior wall 420 extends between the interior surface of the top plate 212 and the interior surface of the bottom plate 216. In other configurations, the fuel tank 404 extends for only a portion of the distance between the end plates 212 and 216. Moreover, the fuel tank 404 can extend beyond a plane of one or both end plates 212 and 216. In addition, some or all of the second interior volume 424 can be occupied by a payload or other components 504. Examples of a payload or components 504 can include, but are not limited to, antennas; instruments, such as telescopes, communications equipment, processors and control equipment, and the like; additional or auxiliary fuel tanks; fuel pumps; batteries; and other deployable spacecraft.

One or more additional or auxiliary storage volumes 508 are located between the side panels 208 and the outside surface of the main structural member 224. These storage volumes 508 can house additional fuel tanks, payload, or components. As another example, one or more of the additional storage volumes 508 can house one or more fuel pumps 512 which can be operated to supply unpressurized fuel from one or more fuel tanks 404 to thrusters 516 or other consumers of pressurized fuel via conduits 520 and 524.

In general, it is desirable for a spacecraft to be relatively compact, in order to reduce the associated moment of inertia (MOI). Accordingly, payloads or components having a relatively high mass will typically be carried in the main or first 304 and second 424 interior volumes, relatively close to the centerline of the spacecraft 108. In addition, relatively high mass payloads or components can be disposed symmetrically about the centerline. Conversely, the additional storage volumes 508 are typically used to carry payloads or components having a relatively low mass.

Figure 6:
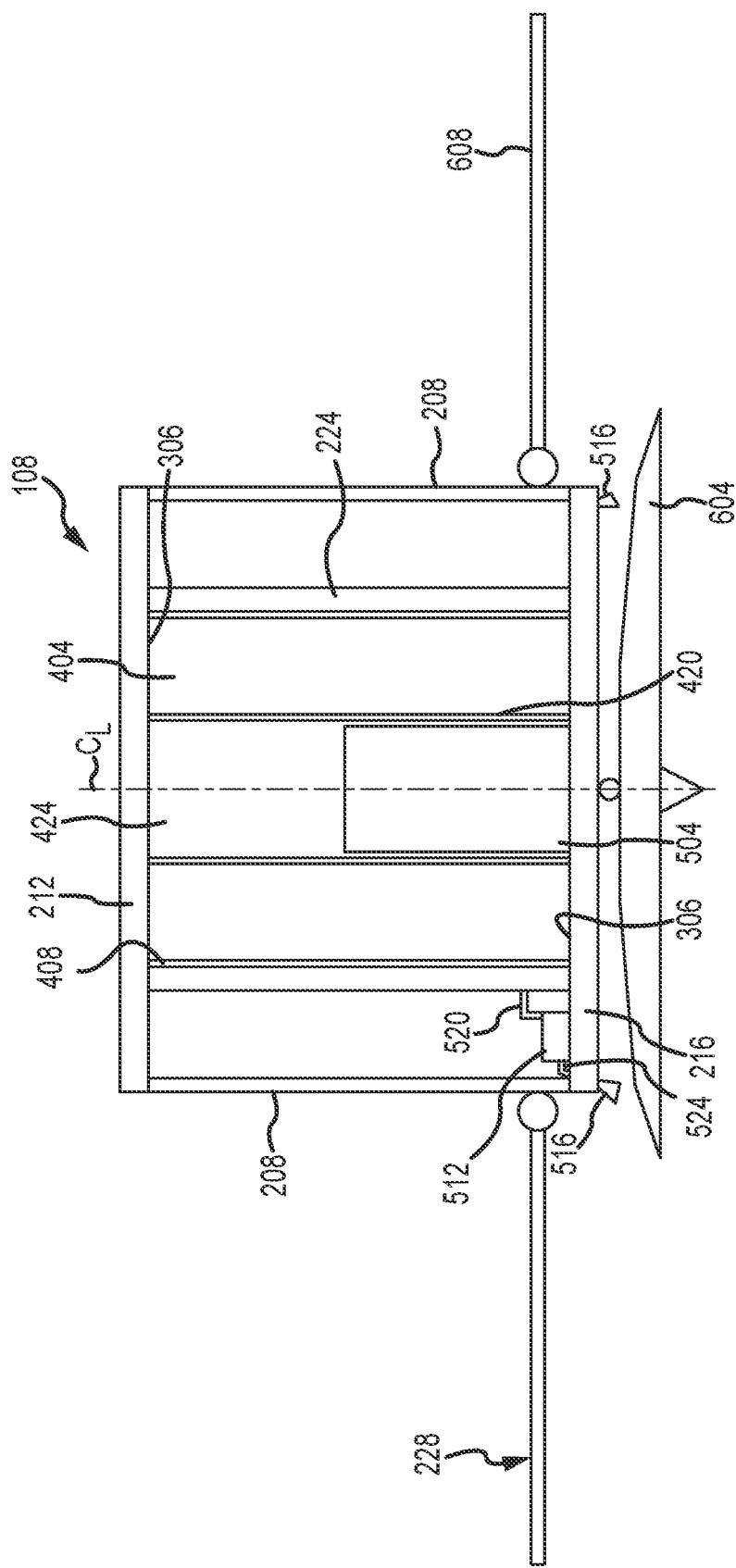
FIG. 6 depicts a cross-section view in elevation of a spacecraft in accordance with other embodiments of the present disclosure, with various components in a deployed configuration.

FIG. 6 depicts a cross-section of the spacecraft 108 in accordance with other embodiments of the present disclosure. In particular, in this example of a spacecraft 108 in accordance with embodiments of the present disclosure, the top 412 and bottom 416 portions or walls of the fuel tank 404 are shared with and defined by an interior surface 306 of the top plate 212 and by an interior surface 306 of the bottom plate 216 respectively. The outer wall of the fuel tank 404 in a width direction is provided by a body portion 408 that extends between the top 212 and bottom plates 216, and the inner wall of the fuel tank 404 in the width direction is provided by an interior wall 420 that extends between the top 212 and bottom plates 216, and that provides a second interior volume 424.

FIG. 6 also depicts example external components 228 in a deployed configuration. In this example, a payload 504 carried within the secondary storage volume 424 includes an antenna with a reflector 604 that is deployed after the spacecraft 108 has separated from the launch vehicle 104. In addition, external spacecraft components 228 in the form of solar panels 608 are shown in an extended position.

Figure 7:
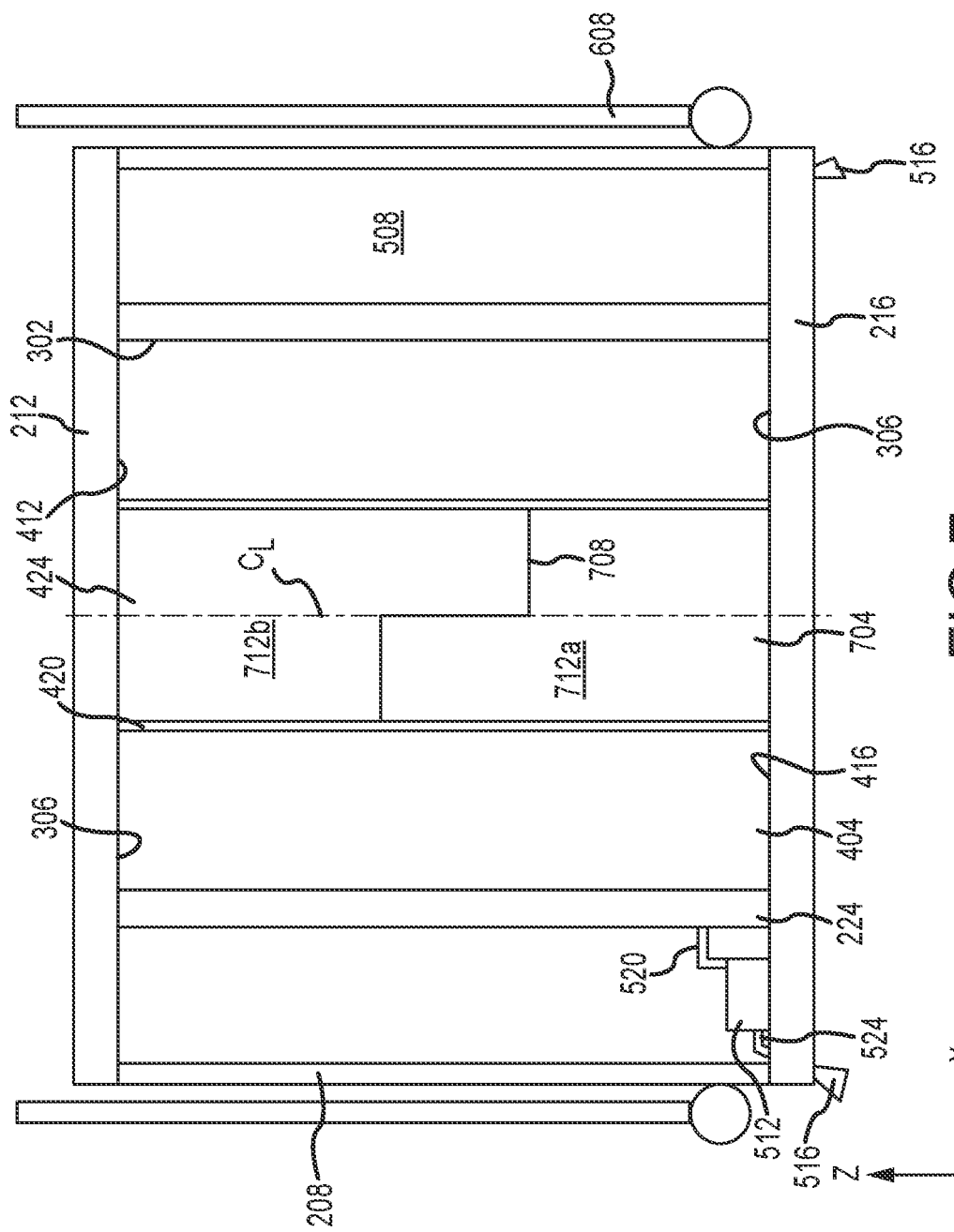
FIG. 7 depicts a cross-section view in elevation of a spacecraft in accordance with other embodiments of the present disclosure.

FIG. 7 depicts a cross-section of a spacecraft 108 in accordance with other embodiments of the present disclosure. In this example the fuel tank 404 has an outer surface or wall 408 that is formed by an inner surface 302 of the main structural member 224, a top surface or wall 412 that is formed by an interior surface of the top plate 212, and a bottom surface or wall 416 that is formed by an interior surface of the bottom plate 216. Accordingly, the fuel tank 404 in such an embodiment can conform exactly to at least portions of the interior volume 304. In addition, an interior wall 420 extends between the top 212 and bottom 216 plates of the support structure 220, thereby defining an annular fuel storage volume, and providing a second interior volume 424 that is centered on the centerline of the spacecraft 108 and that extends between the top 212 and bottom plates 216. The second interior volume 424 can house various components. For example, the figure shows a secondary or auxiliary fuel tank 704 disposed in the second interior volume 424 defined by the primary fuel tank 404. In accordance with embodiments of the present disclosure, the additional fuel tank 704 can be defined by a wall or walls 708 extending between surfaces of the interior wall 420 of the primary fuel tank 404 to define multiple sub-volumes 712 within the interior volume 304, and in particular within the second interior volume 424, with the lower sub-volume 712a in this example forming the additional fuel tank 704. The remaining sub-volume 712b, between a top of the additional fuel tank 704 and the top plate 216, can be open, can be used to carry one or more payload 504 items, can be utilized as additional fuel storage (i.e. it can be yet another fuel tank), or can be occupied in full or in part by yet another fuel tank. In accordance with still other embodiments of the present disclosure, the secondary fuel tank 704 can be provided as a structure that does not share walls with the primary fuel tank 404 or with other components of the spacecraft 108.

As previously noted, the main structural support member 224 need not be cylindrical in form. For instance, the main structural support member 224 can be multifaceted, such as octagonal. The fuel tank 404 may have an exterior surface with a shape that corresponds or conforms to the interior shape of the main structural support member 224, or it may have an outer surface that is formed by the interior surface of the main structural support member 224. Accordingly, the fuel tank 404 can be entirely or partially conformal to the shape of the interior volume 304. In addition, the fuel tank 404 can extend for less than the entire length of the first interior volume 304, for example to leave additional storage volume between a top end portion 412 of the fuel tank 404 and the top end panel 212 of the spacecraft 108. Moreover, the fuel tank 404 need not include a central void.

In accordance with embodiments of the present disclosure, the fuel or propellant in the fuel tank 404, and some or all of any additional fuel tanks, is unpressurized. For example, the fuel contained in the fuel tank 404 can be stored therein in liquid form. As can be appreciated by one of skill in the art after consideration of the present disclosure, pressurized fuel tanks are typically spherical or ellipsoidal in exterior shape due to the need to contain the relatively high internal pressures presented by pressurized fuels. In contrast, unpressurized fuel tanks can more easily be provided in exterior shapes that are configured to conform to available volumes. This in turn allows the usable volume available for payloads and other equipment to be maximized.

Advantages of spacecraft 108 configured in accordance with embodiments of the present disclosure include enabling unusable volumes within the exterior envelope 204 to be reduced or eliminated. In particular, by including a fuel tank 404 having dimensions and shapes that conform to some or all of the surfaces defining an available interior volume 304, space efficiency within that interior volume 304 can be maximized. In addition, by making more usable interior volume 304 available for payloads or components 504, a spacecraft 108 as disclosed herein can be provided with enhanced capabilities, including but not limited to enhanced communications, instrumentation, or other capabilities.

Figure 8:
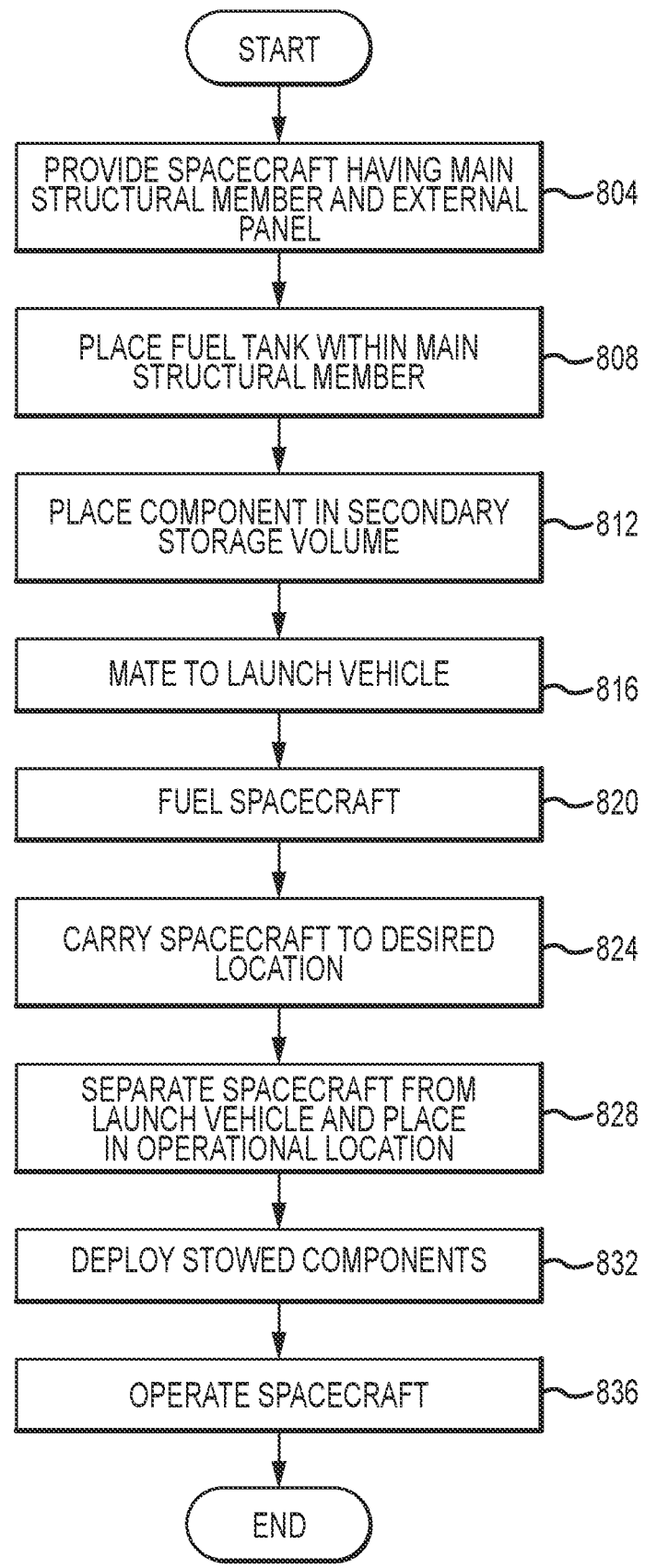
FIG. 8 depicts aspects of a method for configuring and deploying a spacecraft in accordance with embodiments of the present disclosure.

With reference now to FIG. 8, aspects of a method for configuring and deploying a spacecraft 108 in accordance with embodiments of the present disclosure are depicted. Initially, a spacecraft 108 having a main structural member 224 and one or more exterior panels 206 is provided (step 804). The main structural member can be in the form of a hollow cylinder that extends between top 212 and bottom 216 plates or portions of the spacecraft 108. At step 808, a fuel tank 404 having sidewalls 408 that conform to an interior of the main structural member 224 is disposed within a cylindrical interior volume of the main structural member 224. The fuel tank 404 can have a bottom panel 416 that lies against the bottom plate 216 of the spacecraft, and a top panel 412 that that lies against or that is spaced apart from the top plate 216. Moreover, one or more of the sidewalls 408 or ends 412 or 416 can be integral with and provided by the main structural member 224, the top plate 212, or the bottom plate 216. In addition, the fuel tank can be provided with a cylindrical inner sidewall 420 that is parallel to the cylindrical outer sidewall 408. Accordingly, the fuel tank 404 can provide a generally annular fuel storage volume, with a flat top and bottom surface. In addition, a secondary storage volume can be provided within the inner sidewall 420. At step 812, a payload item or spacecraft component is placed within the secondary storage volume 424. As an example, a payload item can include antenna components, such as a folded reflector. As another example, a payload item can include an additional fuel tank.

At step 816, the spacecraft 108 is mated to a launch vehicle 104. This can include using one or more fixing elements provided on or as part of the main structural member 224 to a port 124 of a spacecraft mounting structure 120. The spacecraft 108 can then be fueled, for example by placing fuel in a liquid form into the fuel storage volume of the fuel tank 404 (step 820). The spacecraft 108 is then carried to a desired location by the launch vehicle (step 824). When at the desired location, the spacecraft 108 is separated from the launch vehicle 104, and the spacecraft is placed in an operational location and attitude (step 828). Placing the spacecraft at the operational location and attitude can include providing liquid fuel from the fuel tank 404 to one or more thrusters 516 via a pump 512 and fuel conduits 520, 524. Once in the operational location and attitude, stowed components can be deployed (step 832). This can include extending the folded reflector of an antenna from the secondary storage volume 424 and opening the reflector 604. The spacecraft 108 can then be operated (step 836). The process of configuring and deploying the spacecraft 108 is then complete.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A spacecraft, comprising:
    a main structural member, wherein the main structural member includes an interior surface that defines at least a portion of a first interior volume;
    a fuel tank, wherein the fuel tank provides an annular fuel storage volume, wherein the fuel tank is located within the first interior volume, wherein the fuel tank is conformal with at least a portion of the interior surface of the main structural member, and wherein the fuel tank includes an interior wall that defines a cylindrical second interior volume having open ends;
    a first end panel, wherein the first end panel extends across a first end of the main structural member, defines a first end surface of the first interior volume, and defines a first end surface of the second interior volume;
    a second end panel, wherein the second end panel extends across a second end of the main structural member, defines a second end surface of the first interior volume, and defines a second end surface of the second interior volume, wherein the second interior volume is centered around a central axis of the spacecraft; and
    a deployable antenna, wherein the deployable antenna is stowed in the second interior volume.

2. The spacecraft of claim 1, wherein the fuel tank has a length that is equal to a length of the main structural member.

3. The spacecraft of claim 1, further comprising:
    a payload item or component disposed in the second interior volume.

4. The spacecraft of claim 1, wherein at least a first portion of a storage volume of the fuel tank is defined by an interior surface of the main structural member.

5. The spacecraft of claim 4, wherein at least a second portion of the fuel tank storage volume is defined by a surface of the first end panel, and wherein at least a third portion of the fuel tank storage volume is defined by a surface of the second end panel.

6. The spacecraft of claim 1, further comprising:
    a thruster; and
    a fuel pump, wherein the fuel pump is operable to supply fuel from the fuel tank to the thruster, and wherein the fuel tank is unpressurized.

7. The spacecraft of claim 1, wherein the main structural member extends across a plane defined by the first end panel, and wherein the main structural member incorporates a fixture to secure the spacecraft to a mounting structure of a launch vehicle.

8. The spacecraft of claim 1, further comprising:
    an auxiliary fuel tank, wherein the auxiliary fuel tank is located within the second interior volume.

9. The spacecraft of claim 1, wherein the first and second end panels are substantially planar,
    wherein the first interior volume is cylindrical,
    wherein the fuel tank extends from a planar first end at the first panel to a planar second end at the second panel, and
    wherein the second interior volume is cylindrical.

10. The spacecraft of claim 9, wherein a fuel storage volume of the fuel tank is defined by surfaces of the main structural member, surfaces of the first and second end panels, and the interior wall of the fuel tank.

11. A spacecraft, comprising:
    a main structural member, wherein the main structural member includes a cylindrical body portion;
    a planar top plate, wherein the planar top plate is adjacent a first end of the main structural member;
    a planar bottom plate, wherein the planar bottom plate is adjacent a second end of the main structural member, wherein an interior of the cylindrical body portion, the top plate, and the bottom plate define a first interior volume;
    a fuel tank, wherein the fuel tank includes a cylindrical body portion that conforms to the first interior volume, and wherein the fuel tank is annular and defines a cylindrical second interior volume;
    a fuel pump, wherein the fuel pump is in communication with the fuel tank via a first conduit;
    a thruster, wherein the thruster is in communication with the fuel pump via a second conduit and
    at least one of:
        1) an auxiliary fuel tank, wherein the auxiliary fuel tank is located within the second interior volume; or
        2) an antenna, wherein in a transport mode the antenna is stored within the second interior volume.

12. The spacecraft of claim 11, further comprising:
    a plurality of side panels, wherein the side panels extend between the top plate and the bottom plate; and
    a plurality of support walls, wherein each of the support walls extends between the main structural member and a corresponding side panel.

13. A method for configuring a spacecraft, comprising:
    providing a spacecraft having a main structural member;
    providing a first interior volume within the main structural member;
    disposing a fuel tank within the first interior volume, wherein the fuel tank provides an annular fuel storage volume, and wherein the fuel tank conforms to at least a portion of a surface of the first interior volume; and
    placing a payload item or a spacecraft component in a second interior volume, wherein the second interior volume is a cylindrical volume at least partially defined by an interior wall of the fuel tank, wherein the cylindrical volume has open ends, and wherein the fuel tank that is centered on a central axis of the spacecraft;
    placing a liquid fuel in the fuel tank; and
    supplying fuel from the fuel tank to a thruster using a fuel pump.

14. The method of claim 13, further comprising:
stowing a deployable antenna in the second interior volume; and
after separating the spacecraft from a launch vehicle, deploying the deployable antenna.

15. The method of claim 13, further comprising:
providing an auxiliary fuel tank, wherein the auxiliary fuel tank is located within the second interior volume.

16. The method of claim 15, wherein the auxiliary fuel tank partially occupies the second interior volume.

17. The spacecraft of claim 8, wherein auxiliary fuel tank partially occupies the second interior volume.

18. The spacecraft of claim 11, wherein an antenna is stored within the second interior volume.

19. The spacecraft of claim 11, wherein an auxiliary fuel tank is located within the second interior volume.

20. The spacecraft of claim 11, wherein an antenna is stored within the second interior volume and an auxiliary fuel tank is located within the second interior volume.

* * * * *